United States Patent [19]
Costello

[11] Patent Number: 6,148,771
[45] Date of Patent: Nov. 21, 2000

[54] CHEW ARTICLE FOR ANIMALS PROMOTING DENTAL/GINGIVAL HEALTH

[75] Inventor: Charles P. Costello, Louisville, Colo.

[73] Assignee: Diverse Designs, Inc., Louisville, Colo.

[21] Appl. No.: 09/455,436

[22] Filed: Dec. 6, 1999

[51] Int. Cl.[7] .................................................. A01K 29/00
[52] U.S. Cl. ............................................................ 119/709
[58] Field of Search ................................... 119/702, 707, 119/709, 710, 711

[56] References Cited

U.S. PATENT DOCUMENTS

| | | |
|---|---|---|
| Re. 34,352 | 8/1993 | Markham et al. . |
| D. 351,203 | 10/1994 | Handy . |
| D. 367,504 | 2/1996 | Barzini . |
| D. 370,243 | 5/1996 | Thompson . |
| D. 372,750 | 8/1996 | Schloss . |
| D. 385,002 | 10/1997 | Schloss . |
| D. 393,671 | 4/1998 | Honaker . |
| D. 408,482 | 4/1999 | Morrison . |
| 2,521,703 | 9/1950 | Emmitt . |
| 5,207,420 | 5/1993 | Crawford et al. . |
| 5,553,370 | 9/1996 | VanNatter, III et al. . |
| 5,595,142 | 1/1997 | Chill . |
| 5,758,604 | 6/1998 | Jorgensen . |
| 5,799,616 | 9/1998 | McClung, III . |
| 5,813,366 | 9/1998 | Mauldin Jr. ............................. 119/710 |
| 5,819,690 | 10/1998 | Brown . |
| 5,832,877 | 11/1998 | Markham ................................ 119/710 |
| 5,857,431 | 1/1999 | Peterson ................................. 119/710 |
| 5,865,146 | 2/1999 | Markham ................................ 119/707 |
| 5,865,147 | 2/1999 | Rublin . |
| 5,947,061 | 9/1999 | Markham et al. ...................... 119/710 |
| 5,965,182 | 10/1999 | Lindgren ................................ 119/707 |

OTHER PUBLICATIONS

Extraordinary New Dog Toys (Ad.), Kong Company; 1999.
Fetch & Glow (Ad.); Sunpetttoys.dom; 1999.
New Nylabone Rhine Odd Ball (Ad.), Nylabone Products; Pet Business; Jun. 1999.
Nylabone Rhino Rubber Dong Dental Device (Ad.), Nylabone Products; Dog & Kennel; Jun. 1999.
New Dental Ring the "Toothbrush" Dogs Use Themselves (Ad.), Omega Paw, Inc.; 1999.
Exclusive Kong Rubber Biscuit Ball (Ad.), Kong Company; Dog & Kennel; Oct. 1999.
Just Chew It (Ad.), Planet Pet; 1999.
Food, Fun & Puzzle, Buster Cube—the original food dispensing toy for dogs (Ad.), Virtu Co., Pet Products News, Aug. 1999.
Which Would You Rather Play With? (Ad.), Winga Designs Inc.; Pet Business, Jun. 1999.

*Primary Examiner*—Thomas Price
*Attorney, Agent, or Firm*—Harold A. Burdick

[57] ABSTRACT

A chew article for animals that promotes dental and gingival health, oral exercise, interactive play, and reduction of problem chewing. The article includes a body of elastomeric material having an outer surface interrupted by spaced grooves. Side walls of at least some of the grooves have a corrugated surface configuration including a longitudinal ridge or ridges extending lengthwise intermediate groove depth and spaced from the outer surface of the body. An interior cavity is provided having a constricted access thereinto from without the body, a segment of at least some of the grooves extending through the body and into the cavity thereby defining plural laterally moveable rib portions of the body, the detached rib portions aiding maintenance of more optimal scraping orientation of the ridges when the article is in use.

20 Claims, 4 Drawing Sheets

CHEW ARTICLE FOR ANIMALS PROMOTING DENTAL/GINGIVAL HEALTH

FIELD OF THE INVENTION

This invention relates to animal, particularly pet, products, and, more specifically, relates to non-food articles intended for oral manipulation by animals.

BACKGROUND OF THE INVENTION

Many products have been introduced to animal and pet owners the purpose of which is to promote oral exercise, clean teeth, reduce problem chewing, and/or encourage play. These products (known as chews) have been provided in a wide variety of shapes, are made of many materials (including rubber, plastic, cordage and webbing, animal hides and the like), and often provide for insertion of food items to attract the animal (see, for example, U.S. Pat. Nos. 5,207,420, 5,947,061, 5,553,570, 5,819,690, 5,758,604, 5,595,142, 5,865,147 and 5,799,616).

It has long been known that dental prophylaxis is promoted in pets, and especially dogs, by the scraping of relatively hard surfaces against the pet's teeth encountered in selective chewing (for example, bone chewing). Many now known chews are constructed to serve this purpose and some are even molded with the intent to enhance dental prophylaxis by provision of protrusions of various sorts at the chew's surface structure (see, for example, U.S. Pat. No. Re.34,352).

Such heretofore known chews have not proven altogether satisfactory in achieving the goal of improved dental prophylaxis, however, differences in tooth sizes and shapes, as well as jaw and/or mouth configuration, of various animals having proved to be a difficult design issue. Moreover, while all such heretofore known devices may provide some level of gingival stimulation (as does bone chewing, for example), such chews often do not provide well for gingival exercise and sub-gingival particle release. Further improvements could thus be utilized.

SUMMARY OF THE INVENTION

This invention provides a chew article (or chew toy) for animals, especially pet animals, that promotes dental and gingival health, oral exercise, interactive play, and reduction of problem chewing. The article is attractive to the animal, thus occupying the animal in constructive chewing behavior and play. Various food items may be placed within or on the article to further attract and occupy the animal.

The chew article of this invention is characterized by a body, preferably of elastomeric material, having an outer surface with spaced grooves defined in the outer surface. The grooves have spaced side walls that together define groove depth into the body from the outer surface thereof. At least one of the side walls of at least some of the grooves have a longitudinal ridge extending intermediate the depth and spaced from the outer surface of the body, the ridge provided for scraping an animal's teeth as they enter and exit the groove.

The chew article preferably has an interior cavity within the body, the cavity provided with a constricted access thereinto from without the body. At least a segment of some of the grooves extends through the body and into the cavity, thus allowing movement of an animal's teeth, no matter the size or shape, well into the groove, thus being subjected to scraping at the ridge over a substantial surface area.

Each of the side walls of the grooves is preferably formed with a corrugated surface configuration including the ridge or, more preferably, a plurality of substantially parallel longitudinal ridges (all located intermediate groove depth and spaced from the outer surface of the structure). Where both spaced side walls of a groove are thus configured, the substantially parallel longitudinal ridges at one of the spaced side walls are preferably positioned substantially opposite longitudinal ridges at the other of the spaced side walls.

The body of the article includes structure for receiving, holding and dispensing edible material, such structure including the interior cavity and/or a depression in the body at the outer surface.

It is therefore an object of this invention to provide an improved chew article, or chew toy, for animals, especially pets.

It is another object of this invention to provide a chew article for animals that promotes dental and gingival health, oral exercise, interactive play, and reduction of problem chewing.

It is still another object of this invention to provide a chew article for animals that is attractive to the animal, thus occupying the animal in constructive chewing behavior and play.

It is yet another object of this invention to provide a therapeutic chew article for animals wherein various selected edible items may be placed within or on the article to further attract and occupy the animal in constructive chewing behavior and play.

Is is still another object of this invention to provide a chew article for animals including a body having an outer surface and spaced grooves, each of the grooves having spaced side walls together defining groove depth into the body from the outer surface, at least one of the side walls of at least some of the grooves having a longitudinal ridge defined thereat intermediate the depth and spaced from the outer surface of the body.

It is another object of this invention to provide a chew toy for pets that attracts and occupies the pet while promoting dental/gingival health in its use, the chew toy including an elastomeric structure having an inner surface defining an interior cavity and an outer surface, the outer surface interrupted by spaced grooves formed in the structure, at least a segment of at least some of said grooves extending through said structure to said interior cavity, each of the grooves having spaced side walls together defining groove depth into the structure from the outer surface, at least one of the side walls of at least some of the grooves having a corrugated surface configuration including a plurality of substantially parallel longitudinal ridges.

It is yet another object of this invention to provide a chew toy for pets that attracts and occupies the pet while promoting dental/gingival health in its use, the chew toy including a body having an outer surface and spaced grooves, at least one side wall of at least some of the grooves having a longitudinal ridge defined thereat spaced from the outer surface, the body including structure for receiving, holding and dispensing edible material.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
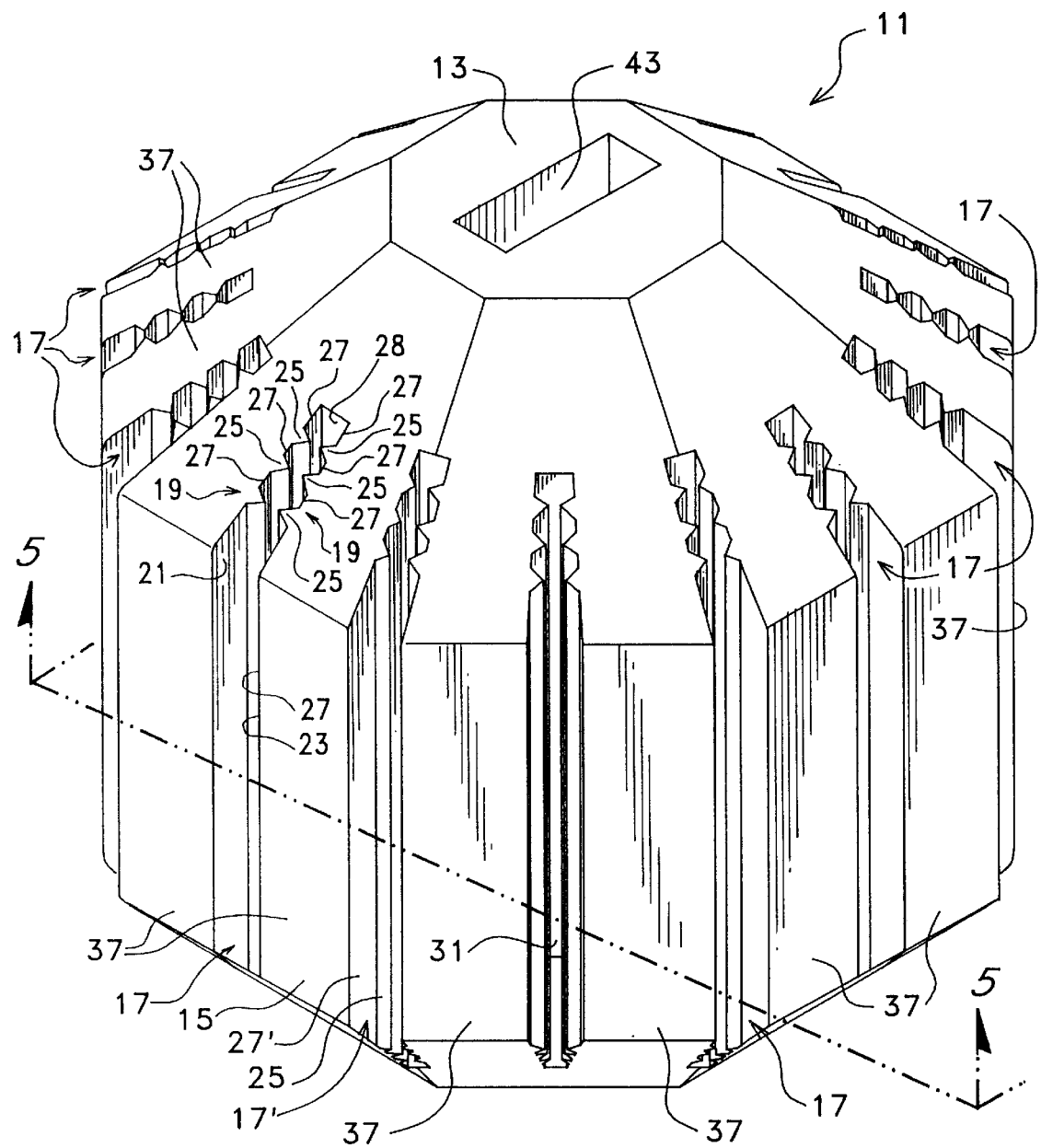
FIG. 1 is a perspective view of a first configuration of the chew article of this invention.
Figure 2:
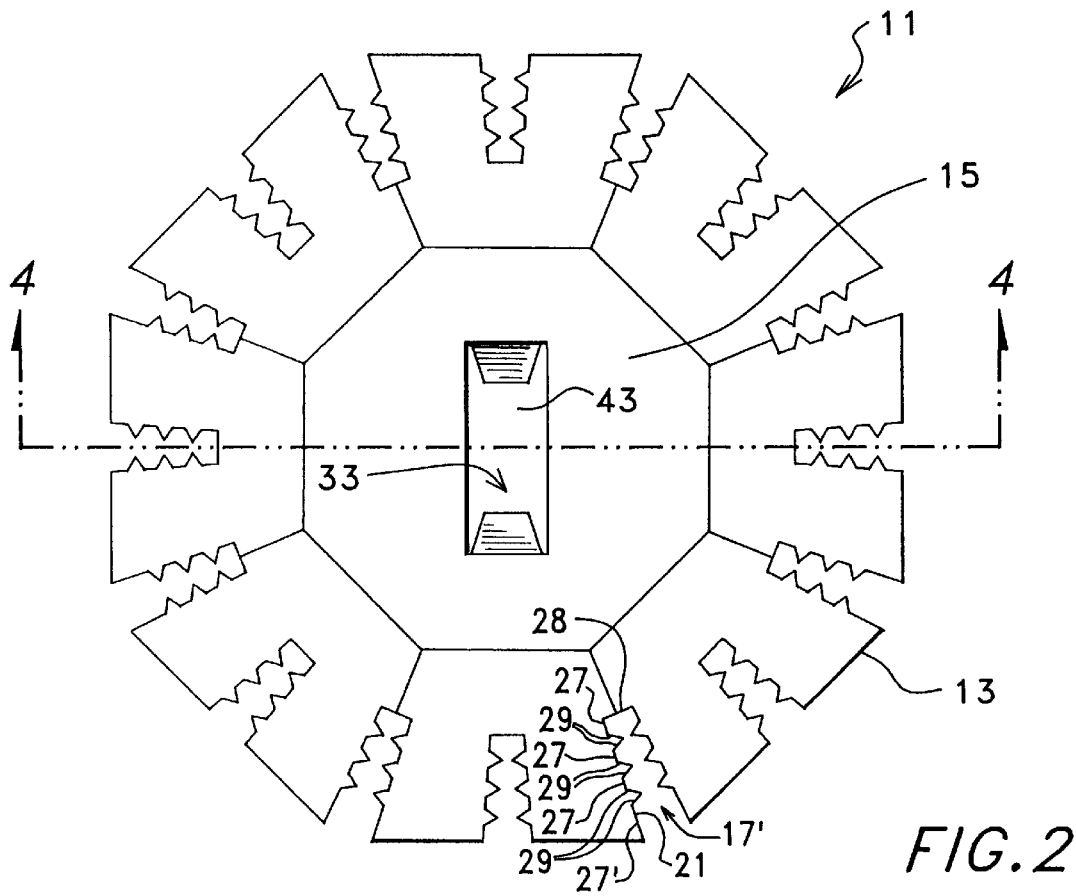
FIG. 2 is an end view of the chew article of FIG. 1.

The principles of the chew article of this invention are illustrated with respect to embodiment 11 of a first selected shape in FIGS. 1 through 5. The article includes an elastomeric body structure 13 formed by injection molding in a cavity mold using any natural rubber or rubber-like compound that is non-toxic and capable of achieving selected hardness characteristics. Particular manufacturing details will depend upon the compound used (polyisoprene, as an example of one suitable compound, is processed at temperatures of between about 300° F. and 350° F. and pressure of approximately 6,000 PSI). When set and cured, the hardness of the chew article body structure should have a durometer measurement of between about 30 and 70 (preferably between about 40 and 50).

The mold is configured so that body structure 13 of chew article 11 is characterized by outer surface 15 interrupted by a plurality of spaced grooves 17 (including groove 17' specially delineated only for purposes of further description exemplary of groove configuration as shown in the FIGURES). Grooves 17 each have a corrugated surface configuration 19 at side walls 21 and 23, the side walls sloping toward one another from outer surface 15 of body structure 13 and together defining groove depth (as identified at groove 17' for purposes of illustration, it being understood that some or all of grooves 17, and one or both of walls 21 and 23 thereof, may be provided with such a corrugated surface configuration, it being only preferred that both walls of all grooves 17 are so configured as illustrated in the drawings). "Corrugated surface configuration", as used in this application, is defined as ridges or channels in a formation having alternating ridges and channels.

Corrugated surface configurations 19 have at least one, and preferably a plurality of substantially parallel longitudinal (i.e., extending in the predominantly lengthwise dimension of the grooves) ridges 25 formed intermediate groove 17 depth and spaced from outer surface 15 of body structure 13. Channels 27 of the corrugated surface configurations are located between and adjacent to longitudinal ridges 25. Channels 27 include intervening channels between ridges and between the innermost ridge and groove bottom 28, as well as end channel 27' adjacent to outer surface 15.

Each of the longitudinal ridges is defined by acutely converging side surfaces 29 (see FIG. 2 at wall 21 of groove 17') extending from an adjacent channel 27, the channels each defined by a surface adjacent the ridge or ridges and a side surface or surfaces 29. When the corrugated surface configuration 19 is formed at both groove side walls 21 and 23, as is preferred, parallel longitudinal ridges 25 at one of the groove side walls are most preferably substantially opposite longitudinal ridges 25 at the other of the groove side walls (see FIGS. 3 and 5 at groove 17').

Figure 3:
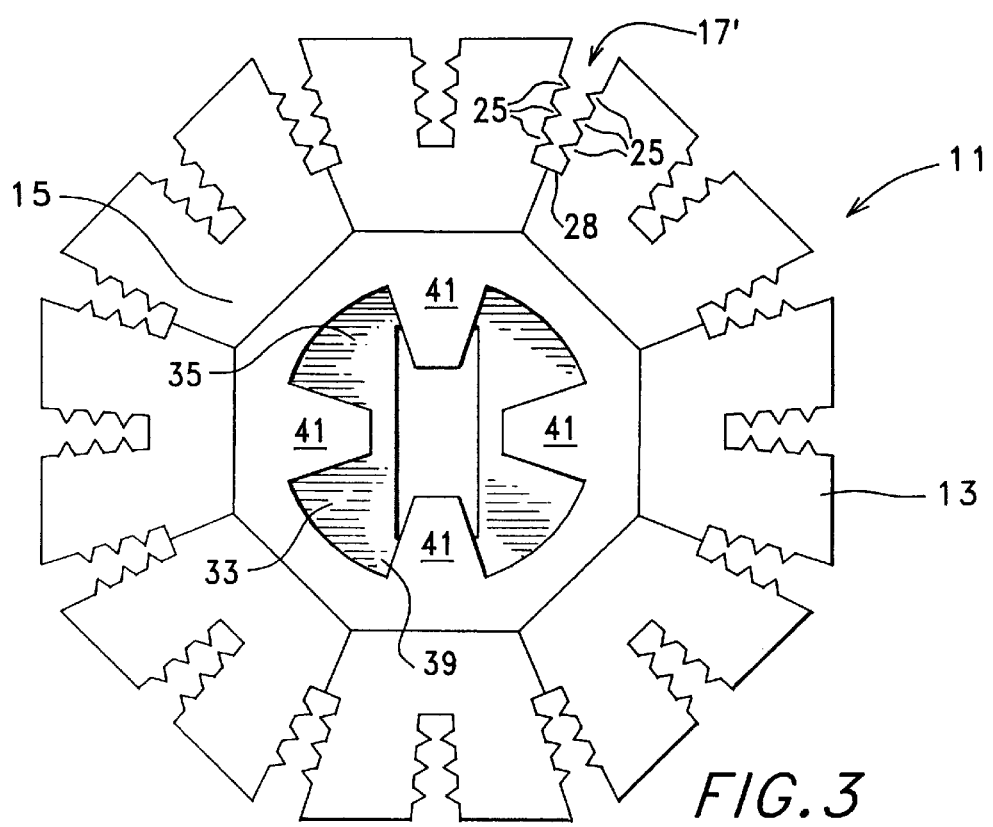
FIG. 3 is an opposite end view of the chew article of FIG. 1.
Figure 4:
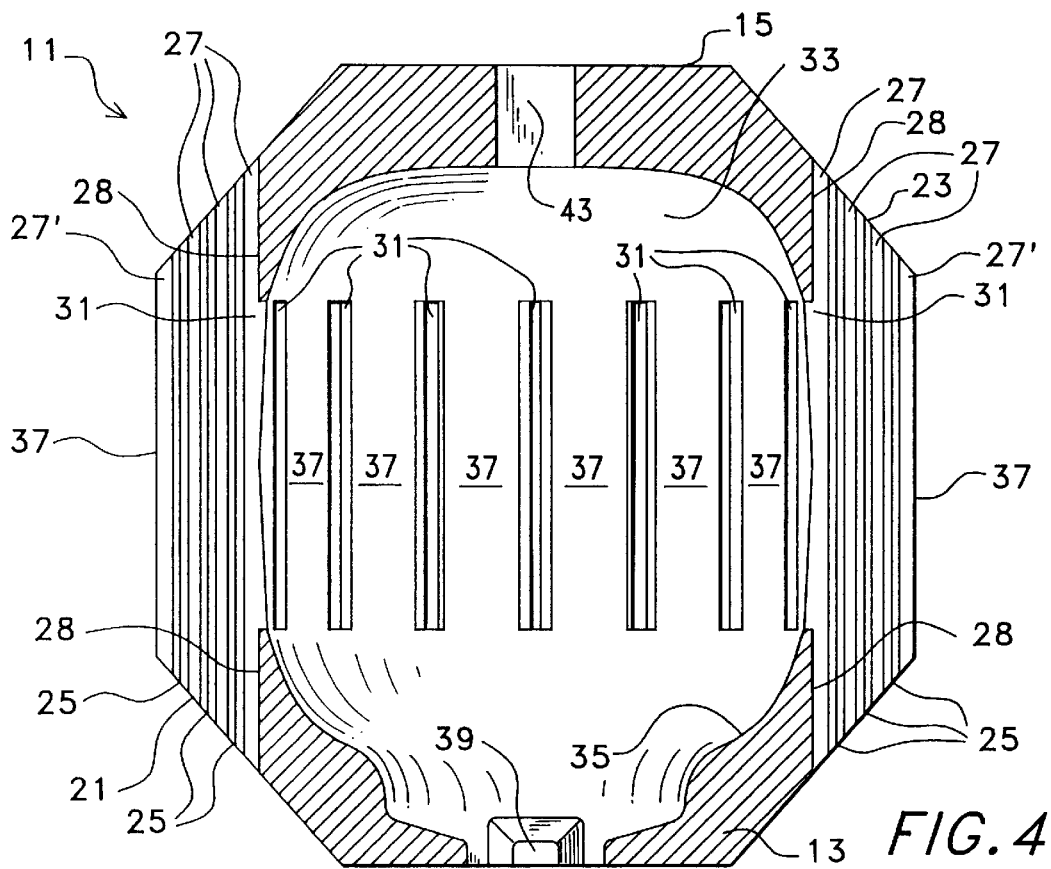
FIG. 4 is a sectional view taken through section lines 4—4 of FIG. 2.
Figure 5:
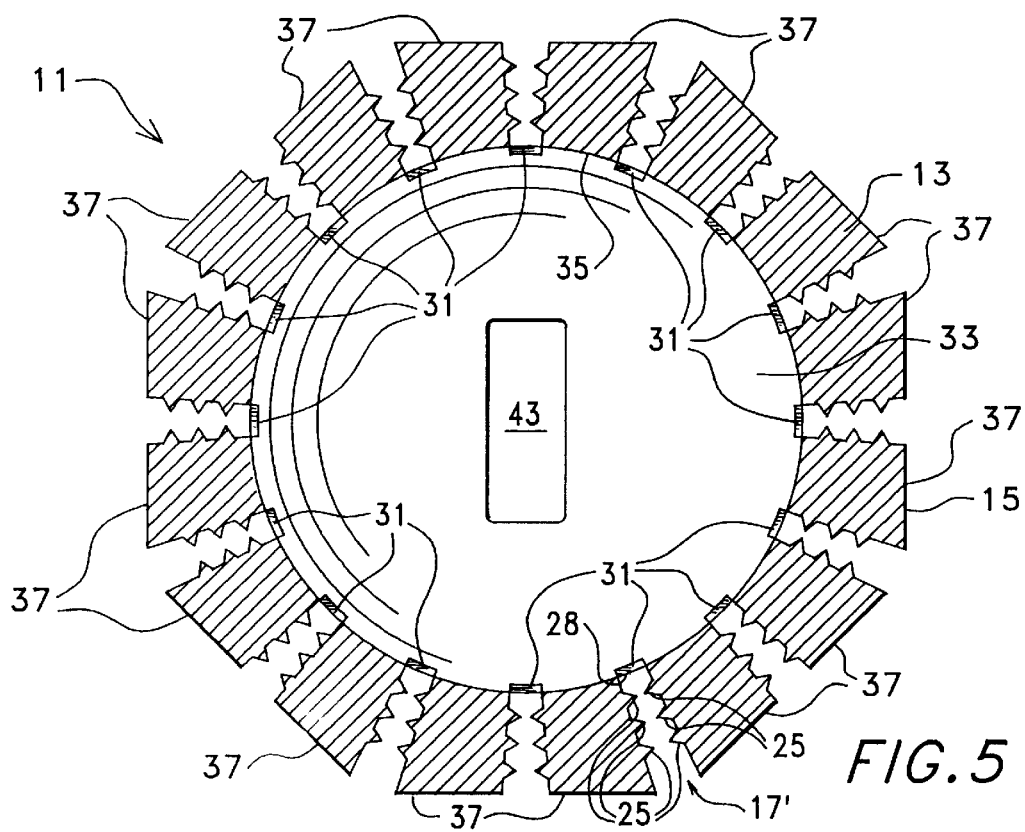
FIG. 5 is a sectional view taken through section lines 5—5 of FIG. 1.

Some or, preferably, all of grooves 17 include a segment 31 at groove bottom 28 opening into interior cavity 33 formed by inner surface 35 (see FIGS. 2 through 5, especially FIGS. 4 and 5). The openings formed at segments 31, which may be formed during a stage of the molding process or in post-processing after release of the article from the mold, define plural independently resilient rib sections 37 of body structure 13. Segments 31 are preferably greater than about half the overall length of a groove 17.

Cavity 33 has access opening 39 configured to receive edible material therethrough to be held in cavity 33 while controlling release of the edible material from cavity 33 therethrough during use of article 11 (see FIG. 3). This is accomplished by provision of constrictions 41 at opening 39, the constrictions forming partial barriers at the opening. At the opposite end of article 11, a second structure for receiving, holding and dispensing edible material is provided, in this case a depression 43 in body structure 13 at outer surface 15 configured to hold a biscuit or other animal snack (see FIG. 2). Depression 43 may be defined through body structure 13 or may be defined in the body structure without passing through to cavity 33.

The shape of the chew article shown in FIGS. 1 through 5 may be described as an angular ball having an octagonal cross-section with each octagonal side having a groove centrally thereat, and with grooves at each intersection between sides. The article may be produced in different sizes for different animals (for example, for dogs, diameters of 4", 3" and 2" to 2.5" would be suitable size categories for various jaw sizes). The various sizes of openings, grooves, ridges, and related spacings may also vary for different animals.

By way of example, in a 4" diameter chew article as shown in FIG. 1 designed primarily for canines, groove wall pairs 21 and 23 of grooves 17 are spaced about 0.25" apart at their opening at surface 15 and about 0.185" apart at groove bottom 28. Grooves are spaced about 0.625" apart at their openings (center to center) at surface 15. Overall groove length is about 2.625" measured at groove bottom 28, segment 31 being about 1.375" long. Groove depth is about 0.5" for mid-side grooves and about 0.625" for grooves at side intersections. Longitudinal ridges 25 extend about 0.06" above channels 27 and are spaced from one another about 0.125" between adjacent side surfaces 29 thereof, a scraping angle of about 60° being formed at the convergence of side surfaces 29 of each ridge 25. The first of the ridges is spaced about 0.125" from surface 15 at mid-side grooves and about 0.186" from surface 15 for grooves at side intersections. Constricted opening 39 to cavity 33 measures about 0.624" between constrictions 41 with an overall diameter including constrictions of about 1.5". Opening 43 measures about 0.375" by 1". Cavity 33 is preferably about 3" across at its midsection.

Figure 6:
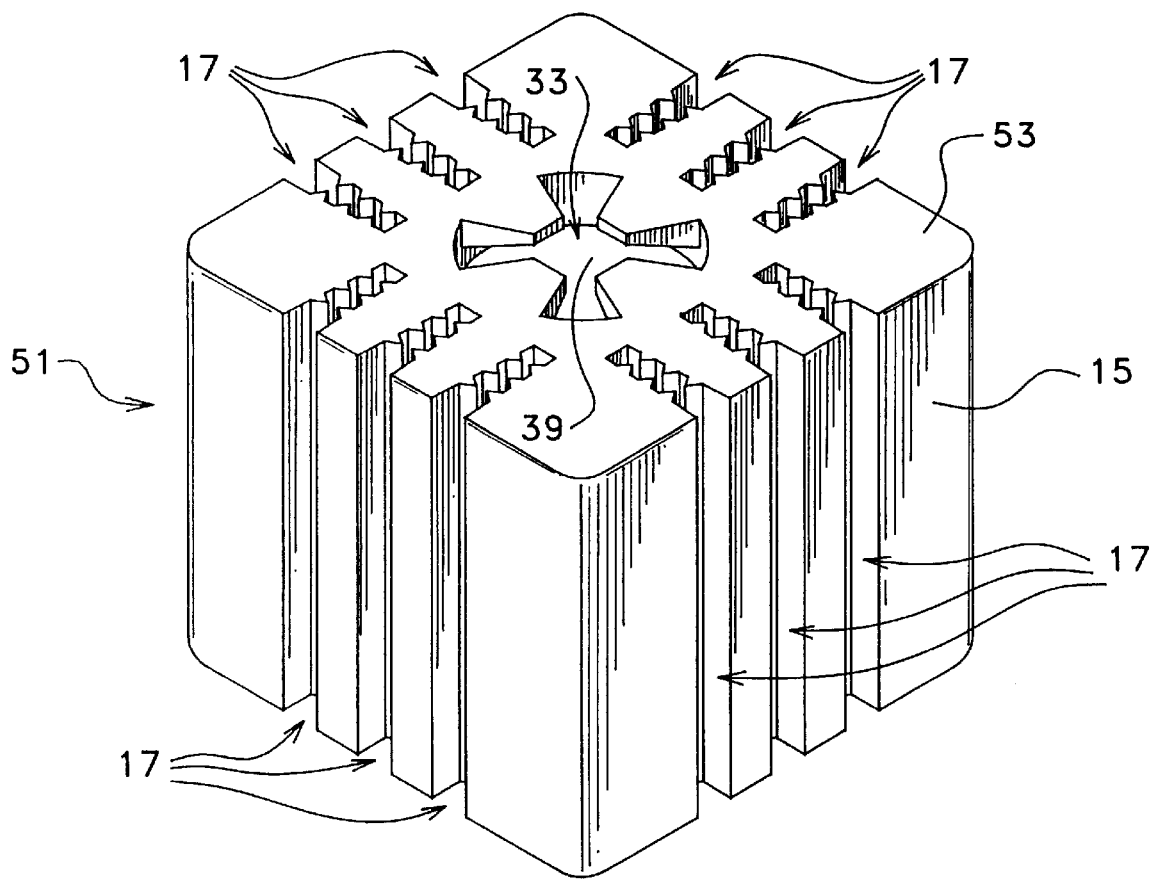
FIG. 6 is a perspective view of a different configuration for the chew article of this invention.
Figure 7:
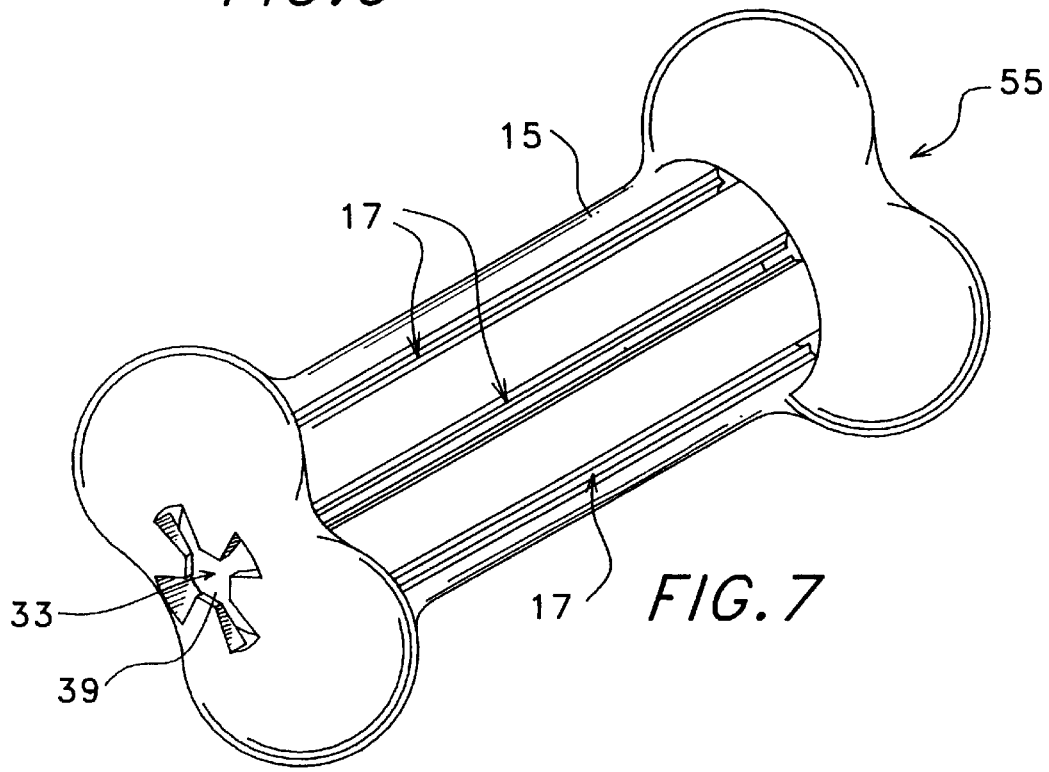
FIG. 7 is a perspective view of yet another differently configured chew article of this invention.

FIGS. 6 and 7 illustrate differently shaped embodiments of this invention. Since the principles of operation and effectiveness of the chew article are substantially the same regardless of overall shape of the article, the chew article may assume nearly any shape selected by a particular designer and/or found most attractive to particular animals.

A cube embodiment 51 is shown in FIG. 6 having constricted access opening 39 to cavity 33 at one side 53 thereof (depression 43 is located at the opposite side).

Grooves 17 (having characteristics as heretofore described) are defined in the remaining four sides of the cube. A bone shaped embodiment 55 is illustrated in FIG. 7. As with the cube embodiment of FIG. 6, the characteristics of the chew article of this invention as previously described are provided here as well.

The chew article, or chew toy, herein described performs dental prophylaxis as an animal bites down on the toy in order to retrieve it, release food from cavity 33 or depression 43, or simply chew or toss it with its mouth. The enamel of a canine's or feline's teeth is prone to excessive plaque and tartar buildup. Many pets are resistant to finger brushing or other brushing regimens that are currently available to slow the buildup. This may lead to deterioration of the teeth and/or tooth threatening periodontal disease.

Dental prophylaxis is primarily performed by ridges 25 scraping on the teeth as the animal's teeth enter and exit grooves 17. Provision of detached rib sections 37 aid in maintaining more optimal orientation of the 60° scraping angles at ridges 25 as the animals teeth move into and out of grooves 17 by allowing relative lateral displacement of the rib, and so the ridges, and resilient return to prior spacing all along groove length.

A secondary benefit is gingival and subgingival stimulation and massage, which releases food particles from beneath the gingival margin thus slowing decay. This benefit is further advanced by the openings at groove segments 31 to cavity 33 allowing substantial tooth movement into the chew toy up to the gums independent of tooth size.

Together, these two functions remove plaque and tartar from the tooth's enamel on occlusal and non-occlusal surfaces effectively performing dental prophylaxis and gingival stimulation. The dental hygiene benefit may be further enhanced by the addition of a desired dentifrice with enzymatic properties at the grooves.

In addition to the hygienic properties of the chew article of this invention, masticatory exercise is encouraged by provision of a areas for edible material (at cavity 33 and depression 43). This promotes vigorous chewing by the animal in an attempt to free the edible material. Configuration of the depression and constricted access is such that release of the edible material is inhibited thus prolonging the chewing episode.

In combination with the ability to carry edibles, the chew toy may be configured in a variety of shapes, sizes, materials, and/or colors to further encourage interactive and/or self play by the animal. For example, provision of irregular surfaces with an elastomeric material body structure makes movement of the article unpredictable and therefore more interesting to the animal. By attracting the animal to the chew article, interaction and exercise are promoted, while undesirable chewing behavior (destructive chewing) is substituted for and thus discouraged or redirected.

As may be appreciated from the foregoing, the chew article of this invention provides hygienic and therapeutic advantages not heretofore provided by now known chews for animals.

What is claimed is:

1. A chew article for animals comprising a body having an outer surface and spaced grooves, each of said grooves having spaced side walls together defining groove depth into said body from said outer surface, said groove depth and side walls spacing selected for receipt between said side walls and into said groove of a substantial part of an animal's tooth during chewing of said chew article even in the absence of significant deformation of said body, at least one of said side walls of at least some of said grooves having a longitudinal ridge defined thereat intermediate said depth and spaced from said outer surface of said body.

2. The chew article of claim 1 wherein said body has an inner surface defining an interior cavity within said body.

3. The chew article of claim 2 wherein at least a segment of each of said at least some of said grooves extends through said body to said cavity thus defining plural independently resilient rib sections of said body.

4. The chew article of claim 2 wherein said body has an access opening to said cavity.

5. The chew article of claim 1 wherein both said spaced side walls of said at least some of said grooves have said longitudinal ridge defined thereat.

6. The chew article of claim 5 wherein said longitudinal ridges define first corrugations in corrugated surface configurations formed at said spaced side walls of said at least some of said grooves.

7. The chew article of claim 1 further comprising a depression in said body at said outer surface configured to hold an edible item therein.

8. A chew toy for pets promoting dental/gingival health in its use, said chew toy comprising an elastomeric structure having an inner surface defining an interior cavity and an outer surface, said outer surface interrupted by spaced grooves formed in said structure, at least a segment of at least some of said grooves extending through said structure to said interior cavity, each of said grooves having spaced side walls together defining groove depth into said structure from said outer surface, at least one of said side walls of said at least some of said grooves having a corrugated surface configuration including a plurality of substantially parallel longitudinal ridges.

9. The chew toy of claim 8 wherein said corrugated surface configuration includes intervening channels between said substantially parallel longitudinal ridges, each of said longitudinal ridges defined by first and second acutely converging side surfaces, each of said intervening channels defined by a surface between adjacent said ridges.

10. The chew toy of claim 8 wherein both said spaced side walls of said at least some of said grooves have a said corrugated surface configuration, said substantially parallel longitudinal ridges formed intermediate said depth and spaced from said outer surface of said structure, and said longitudinal ridges at one of said spaced side walls being substantially opposite longitudinal ridges at the other of said spaced side walls.

11. The chew toy of claim 8 further comprising an access opening through said structure to said interior cavity, said access opening having a constriction thereat.

12. The chew toy of claim 8 wherein said spaced side walls of each of said grooves slope toward one another from said outer surface of said structure.

13. The chew toy of claim 8 wherein said segment comprises over half overall groove length.

14. A chew toy for pets that attracts and occupies the pet while promoting dental/gingival health in its use, said chew toy comprising a body having an outer surface and spaced grooves, each of said grooves having spaced side walls together defining groove depth into said body from said outer surface, said groove death and side walls spacing selected for receipt between said side walls and into said groove of a substantial part of a pet's tooth during chewing of said chew toy even in the absence of significant deformation of said body, at least one of said side walls of at least some of said grooves having a longitudinal ridge defined thereat intermediate said depth and spaced from said outer surface of said body, said body including structure for receiving, holding and releasing edible material.

15. The chew toy of claim 14 wherein said structure includes an interior cavity within said body having a constricted access opening thereinto through said body.

16. The chew toy of claim 15 wherein said structure further includes a depression in said body at said outer surface.

17. The chew toy of claim 15 wherein at least some of said grooves have a segment thereof opening to said interior cavity.

18. The chew toy of claim 14 wherein said body is made of elastomeric material having a durometer measurement of between about 30 and 70.

19. The chew toy of claim 18 wherein said durometer measurement is preferably between about 40 and 50, and wherein said body is configured in the shape of a geometric solid having an octagonal cross section.

20. The chew toy of claim 14 wherein both said spaced side walls of said at least some of said grooves have a corrugated surface configuration including a said longitudinal ridge, said longitudinal ridge at said at least one of said spaced side walls being substantially opposite said longitudinal ridge at the other of said spaced side walls.

* * * * *